H. L. BLOOD.
PLANER AND SYSTEM OF MOTOR CONTROL THEREFOR.
APPLICATION FILED SEPT. 26, 1914.

1,311,208.

Patented July 29, 1919.
5 SHEETS—SHEET 1.

Inventor
Harold L. Blood
By
S. Jay Teller
Attorney

H. L. BLOOD.
PLANER AND SYSTEM OF MOTOR CONTROL THEREFOR.
APPLICATION FILED SEPT. 26, 1914.

1,311,208.

Patented July 29, 1919.
5 SHEETS—SHEET 2.

WITNESSES
C. F. Kalk
J. Kleberg

INVENTOR
H. L. Blood
BY
Duell, Warfield & Duell
ATTORNEYS

H. L. BLOOD.
PLANER AND SYSTEM OF MOTOR CONTROL THEREFOR.
APPLICATION FILED SEPT. 26, 1914.

1,311,208.

Patented July 29, 1919.
5 SHEETS—SHEET 3.

WITNESSES

INVENTOR
H. L. Blood,
BY
ATTORNEYS

H. L. BLOOD.
PLANER AND SYSTEM OF MOTOR CONTROL THEREFOR.
APPLICATION FILED SEPT. 26, 1914.

1,311,208.

Patented July 29, 1919.
5 SHEETS—SHEET 4.

WITNESSES

INVENTOR
H.L. Blood
BY
Duell, Warfield & Duell
ATTORNEYS

H. L. BLOOD.
PLANER AND SYSTEM OF MOTOR CONTROL THEREFOR.
APPLICATION FILED SEPT. 26, 1914.

1,311,208.

Patented July 29, 1919.
5 SHEETS—SHEET 5.

WITNESSES

INVENTOR
H. L. Blood
BY
Duell, Warfield & Duell.
ATTORNEYS

UNITED STATES PATENT OFFICE.

HAROLD L. BLOOD, OF PLAINFIELD, NEW JERSEY, ASSIGNOR TO NILES-BEMENT-POND COMPANY, OF NEW YORK, N. Y., A CORPORATION OF NEW JERSEY.

PLANER AND SYSTEM OF MOTOR CONTROL THEREFOR.

1,311,208.   Specification of Letters Patent.   Patented July 29, 1919.

Application filed September 26, 1914. Serial No. 863,600.

*To all whom it may concern:*

Be it known that I, HAROLD L. BLOOD, a citizen of the United States, residing at Plainfield, in the county of Union and State of New Jersey, have invented certain new and useful Improvements in Planers and Systems of Motor Control Therefor, of which the following is a full, clear, and exact description, such as will enable others skilled in the art to which it appertains to make and use the same.

The invention relates particularly to planers of the type in which each is provided with a reversing driving motor and a generator connected in closed circuit with the motor to supply current thereto and to control it. However, as concerns certain features, the invention is not limited to a planer having a generator motor driving system, and as concerns still other features the invention is not limited to a driving system used in connection with a planer or equivalent machine. It will be understood that when the term "planer" is used herein the intention is to include not only planers strictly so defined, but other machines similar in operation or in function and characterized by having an element which is regularly reciprocated automatically.

One of the objects of the invention is to provide in a planer an efficient and reliable motor control system adapted to effect with certainty and accuracy the various operations required. Another object is to provide simple and reliable apparatus of the above type so constructed as to minimize the danger of over-running of the table. Another object is to provide apparatus in which the control circuits carry only current of small magnitude without requiring making or breaking at any time of a circuit carrying current of the magnitude of the armature current of the motor. Another object is to provide a manual control auxiliary to the automatic control whereby, in case of accident, adjustments and the like, the desired stopping, starting and slow-running may be effected with the greatest facility. Other objects will be in part obvious and in part pointed out hereinafter.

The invention accordingly consists in the features of construction, combinations of elements and arrangement of parts which will be exemplified in the construction hereinafter set forth, and the scope of the application of which will be indicated in the following claims.

In the accompanying drawings wherein are illustrated one or more of various possible embodiments of the several features of the invention, Figure 1 is a side view of a planer and a system of motor control therefor embodying the invention.

Similar reference characters refer to similar parts throughout the several views of the drawings.

Figure 1:
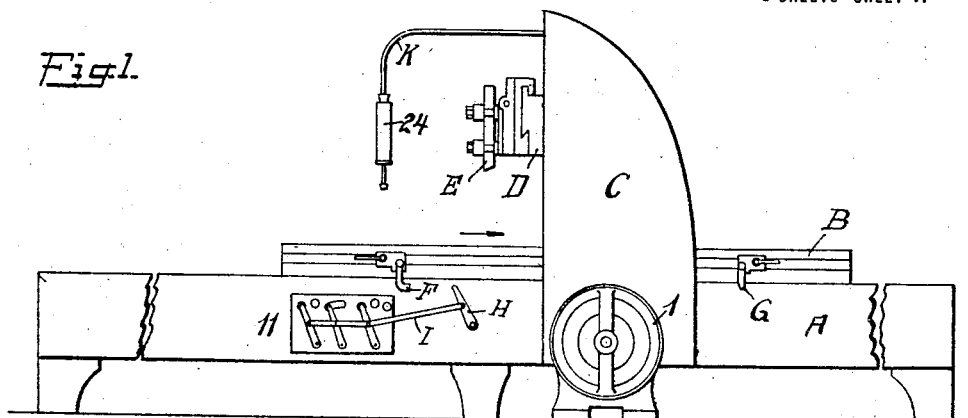
Figure 2:
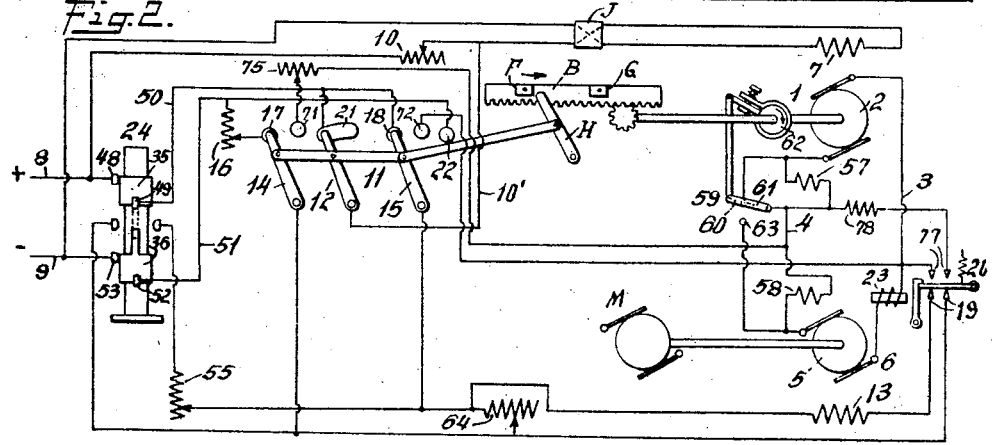
Fig. 2 is a view showing diagrammatically some of the mechanical features of the planer shown in Fig. 1 and also diagrammatically showing the electrical connections.

Referring now more particularly to Fig. 1, there is illustrated a planer having a bed A, a reciprocating table B on the bed, a housing C carrying the crossrail D and a tool and tool holder E carried by the crossrail. The planer is provided with a motor 1 connected through suitable mechanism (such as shown in Fig. 2) with the reciprocating table B. Suitable means is provided for supplying current to the armature 2 of the motor. In accordance with certain features of my invention the motor armature is permanently connected, as by the leads 3, 4, to the armature 5 of a generator 6 adapted to be driven at a substantially constant speed by a suitable means such as an electric motor M. The excitation of the motor 1 is secured through a field winding 7 connected across the mains 8, 9. The planer is provided with an automatic switch 11 which is normally operated by the reciprocating table. The table is provided with adjustable tappets F and G which are adapted to alternately engage a lever H connected with the switch 11 by means of a rod I. When the automatic switch 11 is in its left-hand position connections are made for the forward or cutting stroke of the planer. When the automatic switch 11 is thrown to its right-hand position connections are made for the idle or return stroke. A series resistance 10 is provided for the motor field 7. With the parts in position for the return stroke the resistance 10 is in series with the field which is thus made relatively weak, the motor having a relatively high speed. When the switch 11 is moved to its left-hand position as shown in Fig. 2, the motor field 7 is strengthened by having this series resistance 10 short-circuited at the middle blade 12 of the automatic switch by means of the connection 10', giving in this way a stronger field and correspondingly lower motor speed during the cutting stroke. It will be noted that the field current of the motor traverses the field circuit always in the same direction, varying simply in magnitude according to the direction of travel of the planer table.

The reversal of direction of rotation of the motor is effected by reversing the polarity of the generator field winding 13, the terminals of which are connected, as indicated, to the left-hand and right-hand blades 14, 15, respectively, of the automatic switch 11. An adjustable resistance 16 is provided in the circuit leading to the first upper contact 17 of the switch. When the automatic switch 11 is moved to its left-hand cutting position, as shown, a circuit is completed from the positive main 8, contact 18 and right-hand blade 15 of the automatic switch, toward the right through the generator field 13, thence through the contacts 19 of the circuit breaker 20, left blade 14 and contact 17 of the automatic switch, through the series resistance 16 to the negative main 9. When the switch is thrown toward the right for the return stroke of the planer the generator field current passes from the positive main 8 through the contact 21 and left-hand blade 14, contacts 19, toward the left through the field winding 13, thence through the right-hand blade 15 and contact 22 of the automatic switch to the negative main 9, thus reversing the generator field and omitting from the field circuit the resistance 16. In this way, during the return stroke, there is a weaker motor field of the same polarity as before together with a stronger generator field of reversed polarity, resulting in a reversed rotation of the motor at a speed considerably higher than before. The ratio of cutting speed to return speed may be varied by the adjustment of the resistances 16 and 10 which respectively control the two speeds. In case the stroke normally operated at the lower speed is to be used for the return or idle stroke and the stroke normally operated at the higher speed is to be used for the cutting stroke it is simply necessary to reverse the leads to the motor field or the leads to the dynamo field. A reversing switch J may be provided for this purpose.

In the normal operation of the apparatus the switch 11 is automatically thrown from cutting position to return position by the movement of the planer table at a time shortly prior to the completion of the cutting stroke. There is then a rapid braking of the motor, followed by its acceleration in the opposite direction to a higher speed, which speed is maintained until, at about the end of the return stroke, the automatic switch is thrown over to the cutting position. Then the motor is brought to rest and attains the slower speed in the other direction for the cutting stroke, and this cycle of operations is repeated indefinitely. It will be observed that when the switch 11 is thrown toward the right the blade 12 remains in engagement with the contact 21 for an instant after the blades 11 and 14 have disengaged the contacts 18 and 17. In this way the field of the motor remains strongly energized for an instant at the end of the cutting stroke, thus causing the braking effect to be greater than it otherwise would be. Because of this construction it is possible to so design the motor and the connections therefor that the braking effect at the end of the relatively slow cutting stroke may have the highest possible value consistent with safety. At the end of the relatively fast return stroke the blade 12 is out of engagement with the contact 21, thus causing the motor field to be relatively weak and preventing any excess braking action which might otherwise result because of the increased speed. If at any time during the operation of the apparatus it is found desirable to stop the motor, the automatic switch 11 may be manually thrown to central position. The elongated contact 21 serves to maintain the short circuit around the resistance 10 when the switch 11 is in central position, thus insuring a powerful braking action.

If desired, the operation of the apparatus may be stopped by disconnecting the switch 11 from the mains 8, 9 by suitable manual or automatic devices, one of which will be described in connection with Fig. 2. In case the armature current in the circuit 2—3—5—4 becomes excessive, the apparatus may be protected from overload, as by the circuit-breaker 20, whose coil 23 operates at a predetermined current value therein, to open-circuit the generator field.

Now, in order that the motor may be brought to rest promptly without any excessive or uncertain extent of travel subsequent to the deënergizing of the generator fields means is provided for causing the field magnetism of the generator to assume approximately zero value promptly upon the opening of the field circuit or upon the interrupting of the field current. Preferably a part or all of the magnetic circuit of the generator is, according to certain features of the invention, made of steel laminations or is otherwise constructed in such a way as to reduce to a negligible amount the residual magnetism of the generator. In practice it is found that certain kinds of steel which are best obtained in the form of laminations possess the required low retentiveness. In this way the induced voltage of the generator drops to practically zero the moment the field is deënergized and no current is sent through the armature of the motor. The generator being thus substantially completely deënergized, permits the motor to exert a powerful, rapid and definite braking influence which is not in any way interfered with by electromotive force developed by the generator. Without means for substantially completely deënergizing the generator, sufficient current would be developed even with the generator field circuit open to cause the motor to continue its travel at a low speed but nevertheless to an extent that might well be disastrous to the planer or to an attendant. It will be clear that if such slow movement or creeping were allowed to continue, the switch 11 would automatically be moved to one or the other of its operative positions and the planer would be automatically started. By thus obviating subsequent travel or creeping of the motor there is no need of opening at any time the single circuit 5, 4, 2, 3 that carries heavy current in the entire system. The control is thus exclusively of circuits carrying comparatively small currents, insuring compact and inexpensive switching mechanism easily operated and consuming no appreciable electrical energy.

The reduction or elimination of residual field magnetism of the generator may also be effected by providing means for sending a preliminary reversed current through the generator field circuit prior to the admission thereto of the main reversed energizing current. Preferably when use is made of such a preliminary reversed current, the current is obtained from the main conductors 3 and 4 as the voltage therein is reversed from time to time and always corresponds with the polarity of the generator field 13. It will be clear that connections can easily be made whereby current obtained from the said conductors 3 and 4 will always oppose the field 13. As shown in Fig. 2, contacts 71 and 72 are located to be engaged respectively by the switch levers 14 and 15 when in central positions. The contacts 71 and 72 are connected respectively with the conductors 4 and 3, the connection for the contact 71 preferably being through an adjustable resistance 75. In the ordinary operation of the apparatus the switch arms 14 and 15 sweep quickly over these middle contacts 71 and 72 on their way to their end positions. In this way a current is momentarily sent through the field 13, this current always being in a direction to oppose and overcome the residual magnetism of the field. By thus promptly reducing or eliminating the residual magnetism the braking effect of the motor is increased for the reason that the braking current does not have to overcome the electromotive force arising from the residual magnetism. The resistance 75 when used, may be adjusted so as to vary the strength of the demagnetizing current. The prompt braking of the motor will occur either when the switch is in mid-position only momentarily in passing from one end position to the other as in ordinary operation, or when the switch is simply brought to mid-position and left there as in stopping the planer. In case the switch is left in the position to effect stopping the residual magnetism may be so completely overcome as to entirely eliminate all danger of creeping.

As already stated, the residual magnetism may be overcome or eliminated either by the construction of the generator field of laminated metal or by the provision of means for sending a momentary reversed current through the field winding. Each of these means is effective and under favorable circumstances may be used independently of the other. Preferably, however, in order to have double assurance of the complete elimination of residual magnetism, I prefer to provide both of these means in combination as shown in Fig. 2. It will be clear that with the laminated construction the residual magnetism will automatically approximate zero value upon the interrupting of the field current, and by properly regulating the strength of the preliminary reversed current the residual magnetism can be still further reduced.

For certain purposes, as in an emergency or in making preliminary adjustments, it is often desirable to have a conveniently located and portable means for stopping the motor promptly and operating it in either direction at will, preferably at a comparatively low speed. A preferred device for permitting these operations is illustrated in Fig. 2. The auxiliary control above referred to is effected through a master switch 24 which is shown more in detail in Figs.

Figures 9, 10:
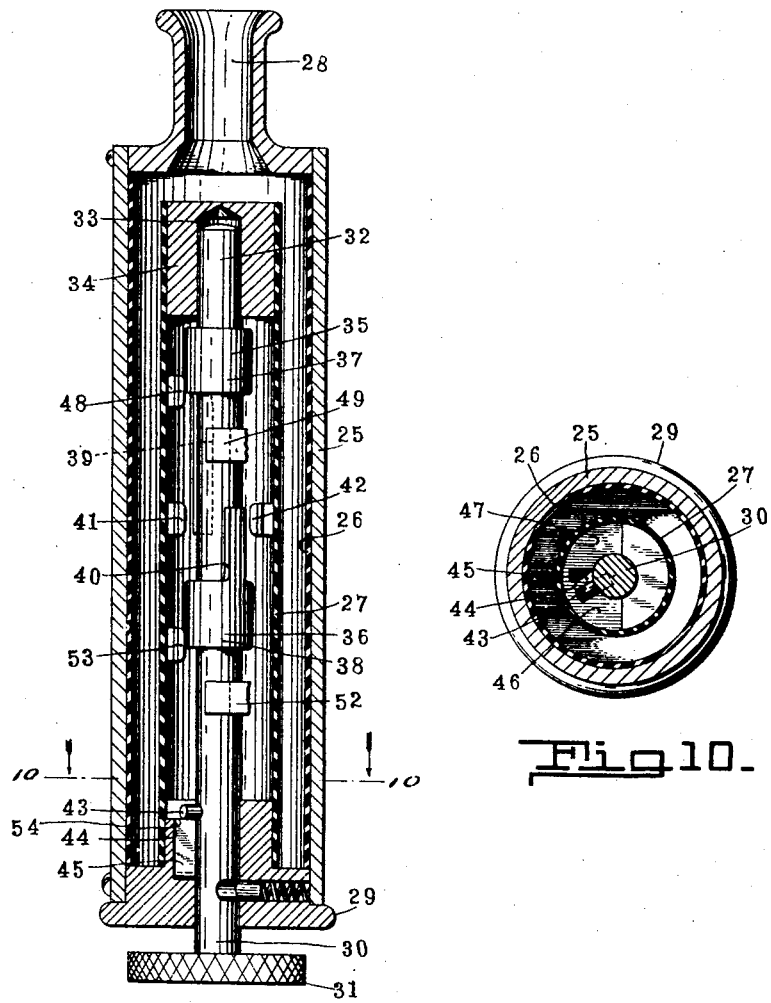
Fig. 9 is an elevation, partly in section, of a preferred form of pendent or master switch.
Fig. 10 is a sectional view on the line 10—10 of Fig. 9.

9 and 10 as comprising a pipe or cylinder 25 preferably of metal and lined with insulating material 26. Mounted concentrically within the cylinder 25 is a tube 27 constructed of insulating material and spaced away from the inner wall of the cylinder, as indicated in Fig. 9. One end of the cylinder 25 has an outlet 28 curved to prevent injury to a cable K, (see Fig. 1) made up of the electrical conductors entering the same, and its opposite end is provided with a head 29 through which passes a longitudinally movable and rotatable rod 30, preferably of insulating material and having an operating knob 31 of suitable shape. The inner end 32 of this rod 30 is guided in a suitably formed recess 33 in a block or head 34 in that end of the tube 27 adjacent the outlet 28. The rod 30 carries two contact members 35 and 36 respectively comprising ring portions 37 and 38 and tongues 39 and 40 extending longitudinally. Mounted on the tube 27 are oppositely disposed contacts 41 and 42 adapted to be engaged respectively by the contact members 35 and 36, whenever the rod 30 is pushed inward a sufficient extent to its neutral or open-circuit position and is then rotated one way or the other through an angle of about 90 degrees. Obviously either of the contacts 35 and 36 can be brought into engagement with either of the contacts 41 and 42 by turning the rod in the proper direction. For the purpose of guiding and limiting the movement of the rod 30 it is provided with an outward projecting pin 43 positioned to slide within a slot 44 in the head 29, the slot comprising a longitudinal portion 45 and two portions 46 and 47 extending in opposite directions from the outer end of the longitudinal portion 45 for about one-fourth the way around the rod 30, whereby it is possible to turn the rod through an angle of 90 degrees either way from the neutral position, or to move the rod longitudinally downward from said position, the paths of movement being guided and limited by the respective portions 45, 46 and 47 of the slot 44.

Current from any suitable source of supply is delivered to the system of Fig. 2 through the mains 8 and 9. When the master switch is in the running position illustrated in Fig. 2, with the pin 43 at the outer end of the longitudinal portion 45 of the slot 44, current passes from the positive main 8 through the fixed contact 48, movable contact member 35, fixed contact 49, to the positive lead 50; thence through the automatic switch 11 and field circuits, as already described, returning through the negative lead 51 from the automatic switch 11 through the fixed contact 52, movable contact member 36 and fixed contact 53 to the negative main 9. If it is found desirable to stop the apparatus at any time, this may be done by pushing inward the operating knob 31 of the pendent switch until the fixed pin 43 extends into the slot 44 at the neutral point 54, where the axial and peripheral portions of the slot intersect. In this position the positive and negative movable contact members 35 and 36 do not energize any of the wires leading to the rest of the system and the apparatus necessarily comes to rest. Whenever a slow speed in one direction or the other is wanted, as in making preliminary adjustments, the operating knob 31 of the pendent switch may be turned in one direction or the other from its neutral position until the fixed pin 43 limits this turning movement, as above indicated. In either of these slow-speed positions the circuit from the mains through the automatic switch and generator field is open so that the only current to the generator field must come through the fixed contacts 41 and 42, which are energized at this time, either from the positive or negative movable contact members 35 and 36, respectively, or from the negative and positive members 36 and 35, respectively, according to the angular position of the operating knob 31. A weak current thus flows through the generator field and the adjustable series resistance 55 to give a comparatively weak excitation that serves to drive the motor slowly in one direction or the other. The motor field, it is noted, is connected on the live side of the pendent switch. Inasmuch as the main automatic switch 11 is entirely disconnected, any movement of this switch either manually or by the table as it travels will have no effect upon the operation of the generator or the motor.

Inasmuch as the motor during normal operation rotates faster during the return stroke than during the cutting stroke, the tendency is for the braking force or resistance to motion following return to be greater than the braking force or resistance to motion following cutting. It is desirable to have each braking force as powerful and as rapid as the motor and mechanical connections will stand without injury, and in order that the braking force following the relatively slow cutting movement may have maximum value without causing the braking force following the faster return movement to be too great, I prefer to provide means whereby the braking force following the return movement is automatically reduced. This I accomplish by momentarily weakening the motor field during the said braking action. Preferably the motor is compounded, being provided with a series winding 57 which is so connected as to aid the field 7 during the return stroke and to oppose it during the cutting stroke.

The effect of this arrangement of the motor field windings is to limit the braking current when decelerating after the return stroke. At this time the current is flowing in the same direction as on the cutting stroke which causes the series field to oppose field 7 thus reducing the braking current since the motor is acting as a generator.

During the cutting stroke the effect of the series field is to decrease torque under heavy cuts. This may be undesirable, in which case a switch 59 is provided, with contacts 60 and 61 adapted to short-circuit the series field of the motor. This switch may be operated from the planer mechanism by any desired means, for instance by a connection 62 which will close the switch at the start of the cutting stroke and open it at the start of the return stroke. Preferably the generator 6 is also compounded, being provided with a series field 58 which is so wound as to aid the field 13 to prevent the generated voltage from falling under load. The switch 59, if desired, may be provided with a contact 63, connected as shown, to short-circuit the generator series field 58 during the return stroke. This causes the generator field to reverse more slowly, at the end of the return stroke, than if the compound winding were effective. This action still further reduces the braking current.

Preferably an ohmic resistance 64 is connected in shunt across the field of the generator. This resistance acts as a field discharge resistance to protect the windings. The circuit breaker 20, in addition to being provided with the contacts 19, is preferably also provided with contacts 77 connected respectively with the main conductors 3 and 4, one of them being connected through the low resistance 78. When the current in the coil 23 becomes sufficiently great the magnet armature is moved to release the swinging bar of the circuit breaker which moves on the action of the spring to disconnect the two contacts 19 and to connect the two contacts 77. In this way the field circuit of the generator is opened and the generator and motor armatures are short-circuited through a low resistance. By short-circuiting the generator and motor armatures a more rapid braking is secured than would be secured by merely opening the generator field circuit.

When the automatic switch 11 is reversed by the planer dogs or otherwise, the generator armature is, for the moment, practically nothing but an ohmic resistance across the rotating armature of the motor inasmuch as the generator field current is *nil*. With the motor field energized at such time from current across the mains, there is developed a powerful dynamic braking action due to this low resistance circuit across the motor armature, with substantially no opposing electro-motive force at the generator. In practice, the parts are so proportioned that the negative torque at this time is as great as possible consistent with safety of operation and wear on the several parts. During the periods of dynamic braking the generator is run as a motor, storing energy either in a fly-wheel, if one be provided in connection with the constant speed drive, or returning power to the mains through the generator driving motor M if a motor drive is utilized, or the power thus obtained from the braking of the planer motor may be made available in other ways to decrease the net power required for the entire operation of the machine.

Figure 3:
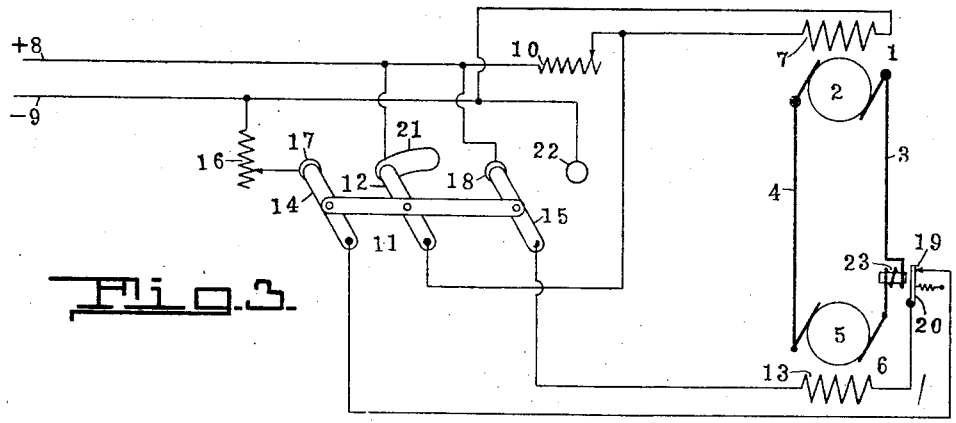
Figs. 3, 4 and 5 are views presenting respectively some of the features shown in Fig. 2, these views illustrating the fact that some of the features of the invention may be used without other features.
Figure 4:
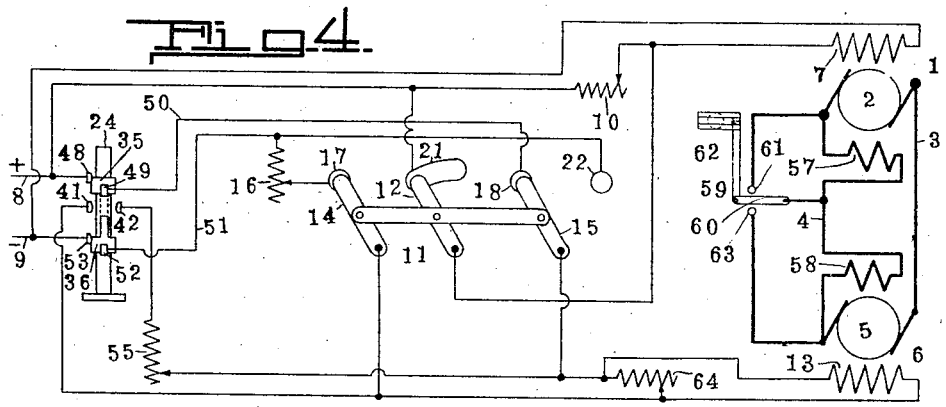
Figure 5:
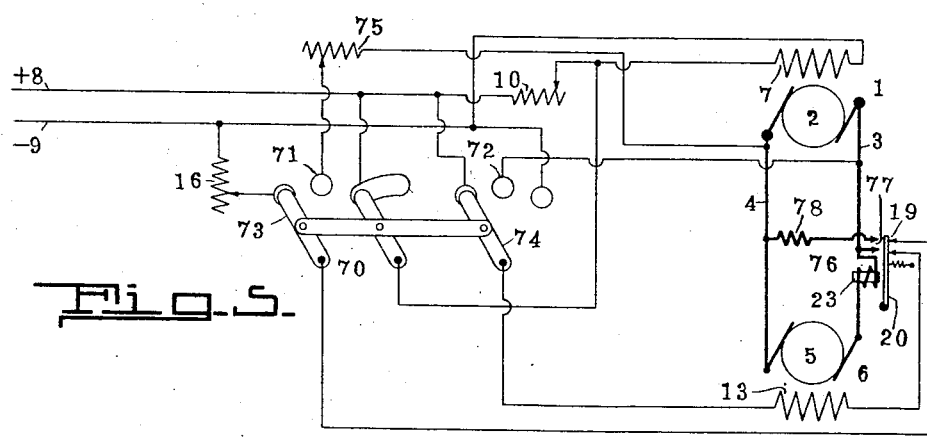

In order to make it clear that some of the features shown in Fig. 2 may be used independently of other features, I have shown in Figs. 3, 4 and 5 certain simplified constructions.

In Fig. 3 there is shown a construction which differs from the construction of Fig. 2 by the omission of the auxiliary or pendent switch, by the omission of the compound windings of the motor and generator and the switch mechanism therefor. In the omission of the means for supplying a preliminary reversing current to the generator field, in the omission of the supplemental short-circuiting contacts for the circuit breaker and in the omission of the ohmic shunt resistance 64 for the generator field. Otherwise the construction is substantially the same as that already described and a repetition of the description is unnecessary.

In Fig. 4 there is shown a construction which more closely resembles the construction of Fig. 2, differing from it principally by the omission of the means for supplying the preliminary reversing current to the generator field and by the omission of the circuit breaker for the generator field. The construction is otherwise substantially the same as that shown in Fig. 2 and repetition of the description is unnecessary. In this figure the pendent or supplemental switch is shown in conjunction with the series windings for the motor and generator, but it will be understood that these parts are not so interdependent that one can not be used without the other. When circumstances require, either may be omitted without omitting the other.

In Fig. 5 I have shown a construction which is very similar to the construction of Fig. 3, but which also includes means for supplying a preliminary reversing current to the generator field as shown in Fig. 2, and a circuit breaker with two sets of contacts as shown in Fig. 2.

Figure 6:
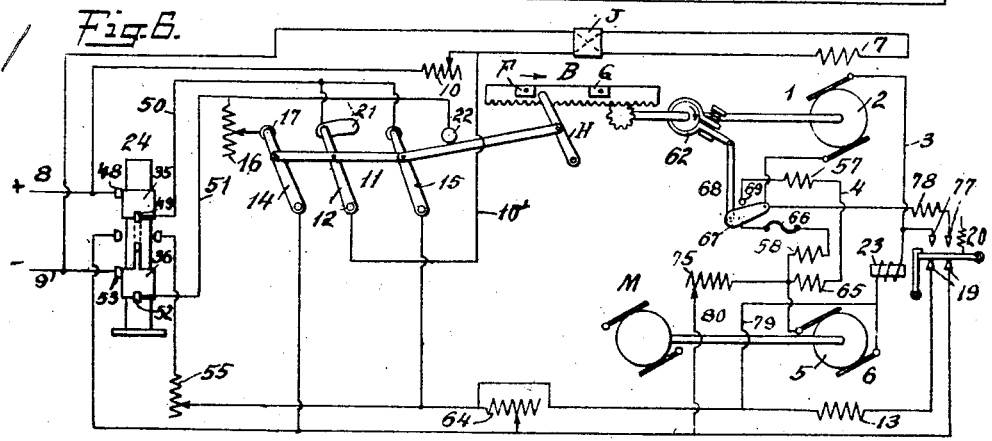
Fig. 6 is a view similar to Fig. 2 but showing another embodiment of the invention.

In Fig. 6 I have shown a construction in many respects similar to that shown in Fig. 2, but differing in certain important ways. The motor and generator are located in a manner similar to that shown in Fig. 2 and their shunt fields are similarly connected, being controlled by means of a switch 11 similar to that already described. As shown, this switch differs from the switch shown in Fig. 2 by the omission of the supplemental contacts 71 and 72. A pendent or auxiliary switch may be provided, and when provided it is constructed and connected in a way similar to that already described. The circuit breaker may be and preferably is the same in construction and connection as the circuit breaker shown in Fig. 2.

The generator and motor are provided respectively with series fields 57 and 58, and an additional series field 65 is provided on the generator. This field opposes the field 13 for a purpose to be explained hereinafter. The field 58 which aids the field 13 to prevent the generator voltage from falling under load is connected through a fuse 66 with the contact 67 of a switch 68 adapted to be operated from the planer mechanism by any desired means which for the sake of simplicity is shown the same as in Fig. 2. The field 57 is connected to another contact 69 of the switch 68. The contacts 67 and 69 are placed so near together that both cannot be uncovered at the same time. This of course is done to prevent the permanent circuit between the generator and motor from ever becoming open.

In operation the switch is controlled by the planer in such a manner that during the idle or return stroke of the latter the blade is in the position opposite to that shown in the drawing and the fields 57 and 65 are in circuit. As previously stated field 57 is so wound as to aid field 7 of the motor during the return stroke and therefore at the termination of this stroke when the circuit through the field 13 of the generator is broken the motor acts as a generator, the current through field 57 is reversed and the latter then opposes field 7. This will result in cutting down the current generated by the motor and consequently the suddenness of the dynamic braking of the motor will be lessened.

Since as stated the series field 65 of the generator is wound to oppose the field 13 it will tend to keep the flux of the generator from changing over when current through the winding 13 is reversed. This will also have an effect in tending to lessen the suddenness of the dynamic braking of the motor.

During the cutting stroke of the motor the switch blade is in contact with 67 and the field 58 is in series with the generator and there will be in effect a simple compound generator delivering to the motor a current of constant voltage under the heavy load due to cutting.

It should also be noted that due to the above arrangement there is never any possibility of the circuit between the generator and the motor becoming open.

As an alternative of the arrangement for nullifying the generator field shown in Fig. 2 the simpler arrangement shown in Fig. 6 may be used. In this case the generator field is connected permanently across the motor armature by conductors 79 and 80 instead of through the contacts 71 and 72. In this case the resistance at 75 must be relatively high in order to limit the current flowing between the field and the armature of the generator when switch 11 is in either extreme position. It is obvious that this arrangement is the same in principle as that shown in Fig. 2 for the circuit through conductors 79 and 80 has an effect upon field 13 only when switch 11 is off either set of terminals. When the switch is on either set of terminals resistance 75 prevents any excess current from flowing through conductors 79 and 80.

Figure 7:
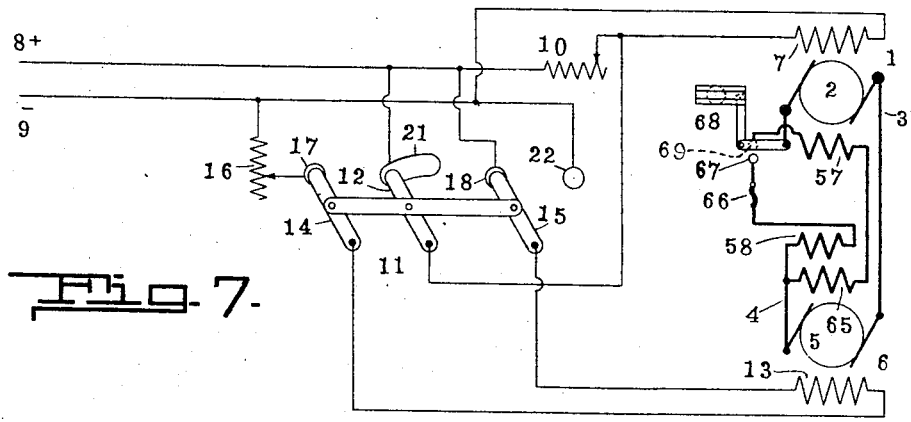
Figs. 7 and 8 are views presenting respectively some of the features shown in Fig. 6, these views also illustrating the fact that some of the features of the invention may be used without other features.
Figure 8:
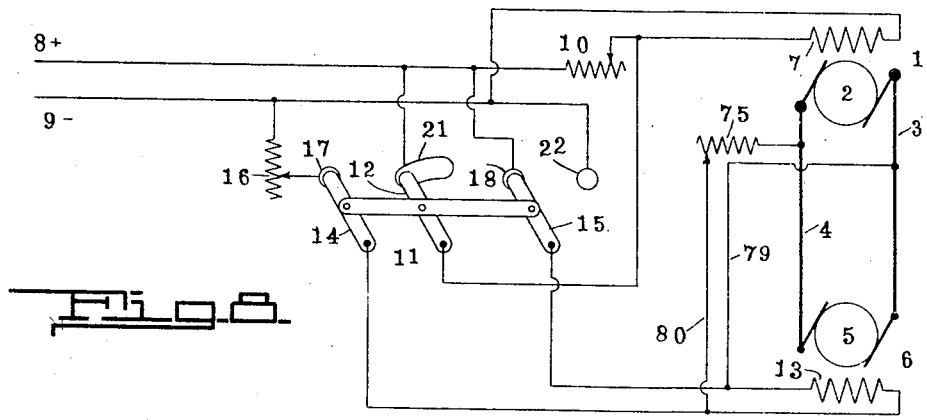

In order to make it clear that some of the features shown in Fig. 6 may be used independently of other features, I have shown in Figs. 7 and 8 certain simplified constructions.

The construction shown in Fig. 7 differs from that shown in Fig. 6 in the omission of the pendent switch, of the circuit breaker, of the short-circuiting field resistance and of the connection for supplying a supplemental reversing current to the generator field. The construction is otherwise similar to that already described and repetition of the description is unnecessary.

Fig. 8 is similar to Fig. 7 but omits the series fields of the motor and generator and the switch therefor, and includes the connection for supplying supplemental reversing current to the generator field.

Figure 11:
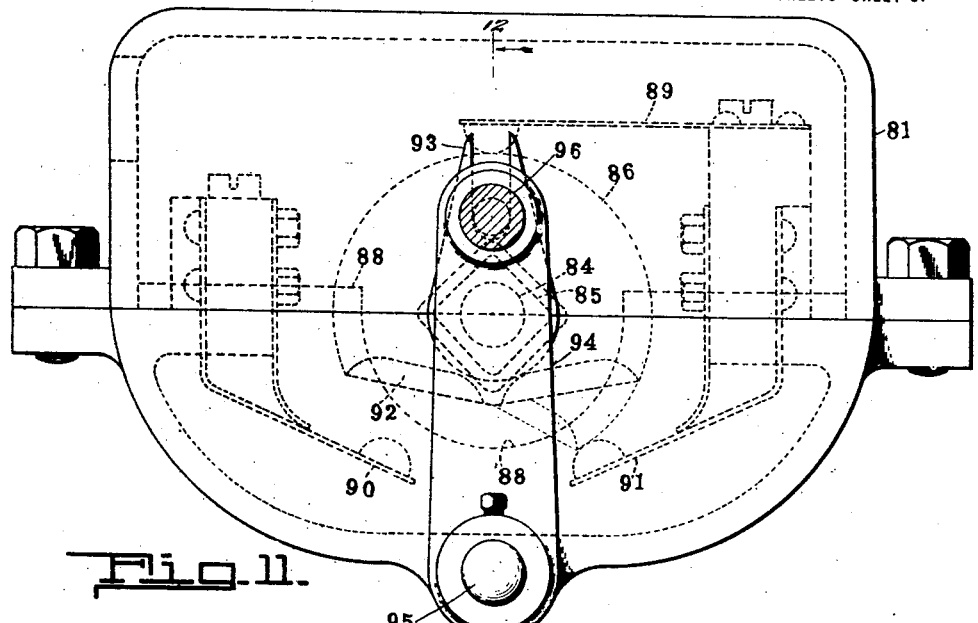
Fig. 11 is a sectional elevation of a preferred form of automatic switch.
Figure 12:
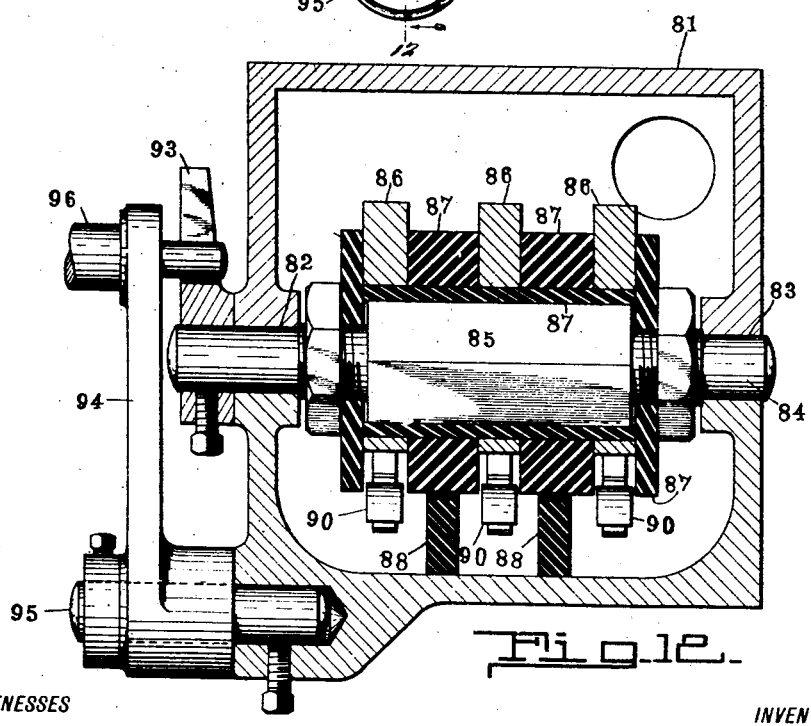
Fig. 12 is a section on the line 12—12 of Fig. 11.

Referring now to Figs. 11 and 12, there is illustrated a preferred type of automatic switch 11 adapted to effect the operations outlined for Figs. 3, 4, 6, 7 and 8 and with a few changes to serve the purposes of the automatic switch 70 of Figs. 2 and 5. The switch may be generally described as three-pole, double-throw, oscillating, oil-break. Within the relatively stationary container 81 there is mounted, in the bearings 82, 83, an oscillating shaft 84, squared as at 85 to carry, for rotation with the shaft, the three contact segments 86, spaced apart and electrically insulated from each other and from the adjacent conducting elements by suitable spacing and insulating members 87 and barriers 88, as indicated clearly in Fig. 12. The contour of these segments (Fig. 11) is such that each is at all times in contact with its respective upper spring finger 89, while contact with the left-hand or right-hand lower spring fingers 90 and 91 is made or broken according to the angular position of the shaft 84. In the neutral or mid-position illustrated in Fig. 11, only one of the segments 86 is in contact with any of the lower spring fingers 90 and 91. If the switch shaft be turned clockwise (Fig. 11), contact will be made between the other segments 86 and the respective right-hand lower spring fingers 91, while if the rotation be in a counter-clockwise direction from the mid-position illustrated in this figure, contact will be made instead with the three left-hand lower spring fingers 90. The arcing, which might be objectionable owing to the inductive character of some of the circuits controlled, is prevented from causing trouble by keeping the container 81 partially filled with oil or other suitable fluid-insulator. By tapering the lower surfaces of the contact segments 86, as indicated at 92 (Fig. 11), the splashing of the oil is effectually avoided. It is to be understood that the oscillation of the switch elements may be effected manually or by a mechanism such as the link I and the lever H actuated by the tappets F and G carried by the planer table B actuated by dogs F and G carried on the planer table B. For a quick positive throw of the shaft 84 from one end position to the other the system of levers indicated in Fig. 12 may be used. Here the shaft has secured to it a short forked lever 93 in operative engagement with a longer lever 94 mounted upon a fixed pivot 95 and connected, as by the pin 96, to suitable mechanism such as the link I.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

It is also to be understood that the language used in the following claims is intended to cover all of the generic and specific features of the invention herein described and all statements of the scope of the invention, which, as a matter of language, might be said to fall therebetween. Certain features of the constructions shown in Figs. 2 and 4 are not specifically claimed herein, but are presented in my copending divisional application, for planers and systems of motor control therefor, Serial No. 210,625 filed January 7th, 1918 and renewed November 23, 1918, as Serial No. 263,935.

Having described my invention, what I claim as new and desire to secure by Letters Patent is:

1. The combination of a reciprocating table, a reversing electric motor connected to the table, a generator having its armature connected in closed circuit with the motor armature, automatic table controlled means for successively reversing the field circuit of the generator to change the polarity and thereby successively reverse the motor and cause it to drive the table successively in opposite directions, and means including a permanently closed circuit acting automatically immediately upon the opening of the normal generator field circuit to supply to the field winding a reversed current supplemental to the current normally supplied to change the polarity and reverse the motor, the supplemental current causing the field magnetism of the generator to assume approximately zero value and thereby preventing the motor from creeping under the influence of residual generator field magnetism.

2. The combination of a reciprocating table, a reversing electric motor connected to the table, a generator having its armature connected in closed circuit with the motor armature and having substantially its entire magnetic circuit formed of laminated metal, automatic table controlled means for successively reversing the field circuit of the generator to change the polarity and thereby successively reverse the motor and cause it to drive the table successively in opposite directions, and means including a permanently closed circuit acting automatically immediately upon the opening of the normal generator field circuit to supply to the field winding a current supplemental to the current normally supplied to change the polarity and reverse the motor, the supplemental current serving in conjunction with the laminated metal of the magnetic circuit to cause the field magnetism of the generator to assume approximately zero value, thereby preventing the motor from creeping under the influence of residual generator field magnetism.

3. The combination of a reciprocating table, a reversing electric motor connected to the table, means for supplying current to the motor, means automatically operated by the reciprocating table for controlling and successively reversing the current supplied to the motor to thereby successively reverse the motor and drive the table successively in opposite directions at different speeds, and means including a short circuit through the motor armature for utilizing the motor to produce relatively strong dynamic braking force following the table movement at the lower speed and relatively weak dynamic braking force following the table movement at the higher speed.

4. The combination of an electric motor, automatic means serving to cause the motor to rotate successively in opposite directions, the said means providing an armature short circuit at the end of rotation in one direction to effect dynamic braking, and automatic means for weakening the motor field during the said braking and thereby reducing the braking current, the last said means being at all other times inoperative to weaken the field.

5. The combination of an electric motor, automatic means serving to cause the motor to rotate successively in opposite directions, the said means providing an armature short circuit at the end of rotation in each direction to effect dynamic braking, and automatic means for weakening the motor field during the braking following rotation in one of the two directions, thereby reducing the braking current, the said means being entirely inoperative during the succeeding rotation in the other direction and during the braking following such rotation.

6. The combination of an electric motor, automatic means serving to cause the motor to rotate successively in opposite directions at different speeds, the said means providing an armature short circuit at the end of rotation in each direction to effect dynamic braking, and automatic means for weakening the motor field during the braking following rotation at the faster speed thereby reducing the braking current, the said means being at all other times inoperative to weaken the field.

7. The combination in a planer or other similar machine, of a reciprocating table, a reversing electric motor connected to the table, circuit connections for the motor causing it to successively reverse and drive the table successively in opposite directions at different speeds and also serving to short-circuit the motor armature at the end of movement in each direction to effect dynamic braking, and automatic means for weakening the motor field during the braking following movement at the faster speed thereby reducing the braking current, the said means being at all other times inoperative to weaken the field.

8. Apparatus of the character described, comprising, in combination, a motor, a field winding thereon, a generator, connections whereby the generator armature current passes through the motor armature, means for reversing the direction of rotation of the motor, a second field winding upon the motor operable during rotation of the motor in one direction, and means for automatically rendering inoperative the second field winding during rotation of the motor in the other direction, the first field winding remaining operative during rotation of the motor in both directions.

9. The combination of a compound electric motor, automatic means serving to cause the motor to rotate successively in opposite directions, the said means providing an armature short circuit at the end of rotation in each direction to effect dynamic braking, the motor connections being such that the series field assists the shunt field during normal operation in one direction and opposes the shunt field during braking following operation in the said direction, and automatic means for cutting out the series field during normal operation in the other direction and during braking following operation in the said other direction.

10. The combination in a planer or other similar machine, of a reciprocating table, a reversing compound electric motor connected to the table, circuit connections for the motor automatically causing it to successively reverse and drive the table successively in opposite directions at different speeds and also serving to short-circuit the motor armature at the end of movement in each direction to effect dynamic braking, the motor connections being such that the series field assists the shunt field during normal operation at the faster speed and opposes the shunt field during braking following such operation, and automatic means for cutting out the series field during the normal operation at the slower speed and during braking following such operation.

11. The combination of an electric motor, a generator having its armature connected in closed circuit with the motor armature, automatic means for successively reversing the generator polarity to successively reverse the motor, the motor acting as a generator during such reversal to effect dynamic braking, and automatic means for weakening the motor field during the braking following rotation in one direction and thereby reducing the braking current, the last said means being at all other times inoperative to weaken the field.

12. The combination in a planer or other similar machine, of a reciprocating table, a reversing electric motor connected to the table, a generator having its armature connected in closed circuit with the motor armature, automatic table controlled means for successively reversing the generator polarity to successively reverse the motor and thereby cause it to drive the table successively in opposite directions, the motor acting as a generator during such reversal to effect dynamic braking, automatic means for causing the motor to run at different speeds in the two directions, and means for weakening the motor field during the braking following movement at the faster speed and thereby reducing the braking current, the last said means being at all other times inoperative to weaken the field.

13. The combination of an electric motor, a compound generator having its armature connected in closed circuit with the motor armature, automatic means for reversing the generator polarity to reverse the motor, the motor acting as a generator during such reversal to effect dynamic braking, and automatic means for cutting out the series field of the generator during rotation of the motor in one direction, the said field being operative during rotation of the motor in the other direction.

14. The combination in a planer or other similar machine, of a reciprocating table, a reversing electric motor connected with the table, a compound generator having its armature connected in closed circuit with the motor armature, automatic means for successively reversing the generator polarity to successively reverse the motor and thereby cause it to drive the table successively in opposite directions, the motor acting as a generator during such reversal to effect dynamic braking, and automatic means for cutting out the series field of the generator during rotation of the motor in one direction, the said field being operative during rotation of the motor in the other direction.

15. Apparatus of the character described, comprising, in combination, a reversing motor, a series field winding in said motor adapted to be effective only at certain times, a generator, a series field winding in said generator adapted to be effective only at certain times, and a circuit permanent during the operation of the apparatus between the generator armature and the motor armature.

16. Apparatus of the character described, comprising, in combination, a motor, a series field winding in said motor, a generator, connections whereby the generator armature current passes through the motor armature, means for reversing the polarity of the generator to thereby reverse said motor, and means for rendering the series field winding ineffective during one direction of rotation of the motor.

17. Apparatus of the character described, comprising, in combination, a motor, a generator, a series field winding in said generator, connections whereby the generator armature current passes through the motor armature, means for reversing the polarity of the generator to reverse thereby said motor, means for causing the motor to operate at different speeds dependent upon its direction of rotation, and mechanically operated means whereby the series field winding of the generator is rendered ineffective during rotation of the motor at the faster speed.

18. Apparatus of the character described, comprising, in combination, a motor, a series field winding in said motor, a generator, a series field winding in said generator, connections whereby the generator armature current passes through the motor armature, means for reversing the polarity of the generator to reverse thereby said motor, and means whereby one or the other of said series field windings is rendered ineffective dependent upon the direction of rotation of the motor.

19. The combination in a planer or other similar machine, of a reciprocating table, a reversing compound electric motor connected to the table, a compound generator having its armature connected in closed circuit with the motor armature, automatic table controlled means for successively reversing the generator polarity to successively reverse the motor and cause it to drive the table successively in opposite directions, the motor acting as a generator during such reversal to effect dynamic braking, means for causing the motor to run at different speeds in the two directions, the motor connections being such that the series field assists the shunt field during normal operation at the faster speed and opposes the shunt field during braking following such operation, automatic means for cutting out the series field during the normal operation at the slower speed and during braking following such operation, and automatic means for cutting out the series field of the generator during rotation of the motor at the faster speed, the said field being operative during rotation of the motor at the slower speed.

20. The combination of a reciprocating table, a reversing electric motor connected to the table, a compound generator having two series field windings one assisting the shunt field winding and the other opposing, the armature of the generator being connected in closed circuit with the motor armature, automatically acting table controlled means for successively reversing the shunt field circuit of the generator to change the polarity and thereby successively reverse the motor and cause it to drive the table successively in opposite directions, and automatic means for cutting out the opposing series winding during rotation of the motor in one direction.

21. The combination of a reciprocating table, a reversing electric motor connected to the table, a compound generator having two series field windings one assisting the shunt field winding and the other opposing, the armature of the generator being connected in closed circuit with the motor armature, automatically acting table controlled means for successively reversing the shunt field circuit of the generator to change the polarity and thereby successively reverse the motor and cause it to drive the table successively in opposite directions, and automatic means for cutting out the assisting series winding during rotation of the motor in one direction.

22. The combination of a reciprocating table, a reversing electric motor connected to the table, a compound generator having two series field windings one assisting the shunt field winding and the other opposing, the armature of the generator being connected in closed circuit with the motor armature, automatically acting table controlled means for successively reversing the shunt field circuit of the generator to change the polarity and thereby successively reverse the motor and cause it to drive the table successively in opposite directions, and automatic means for cutting out the opposing series winding during rotation of the motor in one direction and for cutting out the assisting series winding during rotation of the motor in the other direction.

23. Apparatus of the character described, comprising, in combination, a motor, a generator, a plurality of series field windings in said generator, connections whereby the generator armature current passes through the motor armature, means for reversing the polarity of the generator, to reverse thereby said motor, means for causing the motor to operate at different speeds dependent upon its direction of rotation, and means dependent upon the direction of rotation of the motor for rendering effective either one or the other of said field windings in said generator.

24. The combination of a reciprocating table, a reversing electric motor connected to the table, a compound generator having two series field windings one assisting the shunt field winding and the other opposing, the armature of the generator being connected in closed circuit with the motor armature, automatically acting table controlled means for successively reversing the shunt field circuit of the generator to change the polarity and thereby successively reverse the motor and cause it to drive the table successively in opposite directions, means for causing the motor to have different speeds in the two directions of rotation, and automatic means for cutting out the opposing series winding during rotation of the motor at the slower speed and for cutting out the assisting series winding during rotation of the motor at the faster speed.

25. Apparatus of the character described, comprising, in combination, a motor, a series field winding in said motor, a generator, a series field winding in said generator, a second series field winding in said generator, connections whereby the generator armature current passes through the motor armature, means for reversing the polarity of the generator to reverse thereby said motor, means for causing the motor to operate at different speeds dependent upon its direction of rotation, and means for rendering one of said field windings in said generator ineffective during one direction of rotation of said motor and for rendering the other of said field windings ineffective during the rotation of said motor in the opposite direction.

26. The combination of a reciprocating table, a reversing compound electric motor connected to the table, a compound generator having two series field windings one assisting the shunt field winding and the other opposing, the armature of the generator being connected in closed circuit with the motor armature, automatically acting table controlled means for successively reversing the shunt field circuit of the generator to change the polarity and thereby successively reverse the motor and cause it to drive the table successively in opposite directions, means for causing the motor to have different speeds in the two directions of rotation, and automatic means for cutting out the opposing series winding during rotation of the motor at the slower speed and the assisting series winding during rotation of the motor at the faster speed and for cutting out the series field of the motor during rotation at the slower speed.

27. Apparatus of the character described, comprising, in combination, a motor, a generator, connections whereby the generator armature current passes through the motor armature, means for reversing the generator excitation to reverse thereby the motor, resistances located respectively in the field circuits of motor and generator and alternately short-circuited in accordance with the direction of rotation of the motor, and a field winding for said motor adapted to reverse its polarity as the motor reverses to effect thereby the relative speed of the motor according to its direction of rotation.

28. Apparatus of the character described, comprising, in combination, a motor, a generator, connections whereby the generator armature current passes through the motor armature, and a switch adapted in one position to energize the generator field weakly and the motor field strongly, in another position to deënergize the generator field and maintain the motor field strongly energized and in a third position to energize the generator field strongly and the motor field weakly.

29. Apparatus of the character described, comprising, in combination, a motor, a generator, connections whereby the generator armature current passes through the motor armature, and a switch adapted to reverse the generator excitation and simultaneously alter the field strength of said motor, the motor excitation being comparatively strong in the mid-position of the switch.

30. Apparatus of the character described, comprising, in combination, a motor, a generator, connections whereby the generator armature current passes through the motor armature, and a switch adapted in one position to energize the generator field strongly and the motor field weakly, and in another position to reverse and reduce the generator excitation and simultaneously to increase the motor excitation, the motor excitation being comparatively strong in the mid-position of the switch to provide a strong flux for dynamic braking.

31. Apparatus of the character described, comprising, in combination, a motor, a series field winding in said motor, mechanism adapted to be driven from said motor, a generator, a series field winding in said generator, connections whereby the generator armature current passes through the motor armature, a switch adapted to reverse the generator excitation and simultaneously alter the field strength of the motor, a second switch adapted to alternately render inoperative the series field windings of said motor and said generator, and means for operating said switches automatically from said mechanism.

32. Apparatus of the character described, comprising, in combination, a motor, a series field winding in said motor, a machine tool mechanism adapted to be reciprocated by the motor, a generator, a series field winding in said generator, connections whereby the generator armature current passes through the motor armature, a switch adapted to render inoperative the series field of said motor and said generator alternately, a switch adapted to reverse the generator excitation, and means for operating said switches automatically from reciprocating elements of said mechanism.

33. Apparatus of the character described, comprising, in combination, a motor, a generator, connections whereby the generator armature current passes through the motor armature, a switch adapted to reverse the generator excitation, and means independent of said switch for bringing the motor to rest whenever the motor armature current exceeds a predetermined value, and for simultaneously short-circuiting the motor armature.

34. Apparatus of the character described, comprising, in combination, a motor, a generator, connections whereby the generator armature current passes through the motor armature, and means for bringing the motor to rest whenever the motor armature current exceeds a predetermined value, and for simultaneously decreasing the external resistance across the motor armature.

35. The combination of a reciprocating table, a reversing electric motor connected to the table, a generator having its armature connected in closed circuit with the motor armature, an automatic table operated switch for successively reversing the field circuit of the generator to change the polarity and thereby successively reverse the motor and cause it to drive the table successively in opposite directions, and a manually operable switch supplemental to the automatic switch for controlling and reversing the field current of the generator.

36. The combination of a reciprocating table, a reversing electric motor connected to the table, a generator having its armature connected in closed circuit with the motor armature, an automatic table operated switch for successively reversing the field circuit of the generator to change the polarity and thereby successively reverse the motor and cause it to drive the table successively in opposite directions, a manually operable switch supplemental to the automatic switch for controlling and reversing the field current of the generator, and means for rendering the automatic switch inoperative when the supplemental switch is in use.

37. The combination of a reciprocating table, a reversing electric motor connected to the table, a generator having its armature connected in closed circuit with the motor armature, an automatic table operated switch for successively reversing the field circuit of the generator to change the polarity and thereby successively reverse the motor and cause it to drive the table successively in opposite directions, a manually operable switch supplemental to the automatic switch for controlling and reversing the field current of the generator, and means automatically operable by the supplemental switch for rendering the automatic switch inoperative when the supplemental switch is in use.

38. The combination of a reciprocating table, a reversing electric motor connected to the table, a generator having its armature connected in closed circuit with the motor armature, an automatic table operated switch for successively reversing the field circuit of the generator to change the polarity and thereby successively reverse the motor and cause it to drive the table successively in opposite directions, and a manually operable switch supplemental to the automatic switch for controlling and reversing the field current of the generator and for causing the motor to rotate at a speed slower than normal speed.

39. The combination of a reciprocating table, a reversing electric motor connected to the table, a generator having its armature connected in closed circuit with the motor armature, an automatic table operated switch for successively reversing the field circuit of the generator to change the polarity and thereby successively reverse the motor and cause it to drive the table successively in opposite directions, a manually operable switch supplemental to the automatic switch for controlling and reversing the field current of the generator, and a resistance in circuit with the supplemental switch for causing the generator field current to be less than normal.

40. The combination of a reciprocating table, a reversing electric motor connected to the table, a generator having its armature connected in closed circuit with the motor armature, an automatic table operated switch for successively reversing the field circuit of the generator to change the polarity and thereby successively reverse the motor and cause it to drive the table successively in opposite directions, a manually operable switch supplemental to the table operated switch for controlling and reversing the field current of the generator, means for rendering the automatic switch inoperative when the supplemental switch is in use, and circuit connections for the motor field independent of both of the switches.

41. The combination of a reciprocating table, a reversing electric motor connected to the table, a generator having its armature connected in closed circuit with the motor armature, an automatic table operated switch for successively reversing the field circuit of the generator to change the polarity and thereby successively reverse the motor and cause it to drive the table successively in opposite directions, means controlled by the automatic switch for varying the strength of the motor field, a manually operable switch supplemental to the table operated switch for controlling and reversing the field current of the generator, means for rendering the automatic switch inoperative when the supplemental switch is in use, and circuit connections for the motor field independent of both of the switches.

42. In a planer or other machine comprising a reciprocating table and a reversible table driving electric motor, the combination with the table and the motor, of a table operated switch serving to effect the reversal of the motor at intervals and thereby cause the table to reciprocate, a manually operable switch supplemental to the table operated switch and adapted to effect the starting, stopping or reversal of the motor at the option of the operator, and means for varying the speed of the motor when under the control of the manually operable switch, the said means being supplemental to the devices which normally control the motor speed.

43. In a planer or other machine comprising a reciprocating table and a reversible table driving electric motor, the combination with the table and the motor, of a table operated switch serving to effect the reversal of the motor at intervals and thereby cause the table to reciprocate, means causing the motor to have different speeds in the two directions of rotation, a manually operable switch supplemental to the table operated switch and adapted to effect the starting, stopping or reversal of the motor at the option of the operator, and means for varying the speed of the motor when under the control of the manually operable switch, the said means being supplemental to the devices which normally control the motor speed.

In testimony whereof I affix my signature, in the presence of two witnesses.

HAROLD L. BLOOD.

Witnesses:
GEO. B. WEAN,
C. W. ZEITER.

---

It is hereby certified that in Letters Patent No. 1,311,208, granted July 29, 1919, upon the application of Harold L. Blood, of Plainfield, New Jersey, for an improvement in "Planers and Systems of Motor Control Therefor," errors appear in the printed specification requiring correction as follows: Page 2, line 40, commencing with the word "is" strike out all to and through the word "shown" line 41, and insert the words *is thrown toward the left to the position shown for the cutting stroke of the planer;* page 5, line 89, for "therefor. In" read *therefor, in;* page 7, lines 25-26, strike out the words "actuated by dogs F and G carried on the planer table B;" page 10, line 23, claim 23, after the word "generator" strike out the comma; page 11, lines 46 and 55, claims 33 and 34, after the word "value," strike out the commas; and that the said Letters Patent should be read with these corrections therein that the same may conform to the record of the case in the Patent Office.

Signed and sealed this 2nd day of September, A. D., 1919.

[SEAL.]

M. H. COULSTON,
Acting Commissioner of Patents.

Cl. 172—240.